Jan. 19, 1943.          P. A. NOXON                 2,308,566
              MAGNETIC REPEATER OR COMPASS
                  Filed June 13, 1940         2 Sheets-Sheet 1
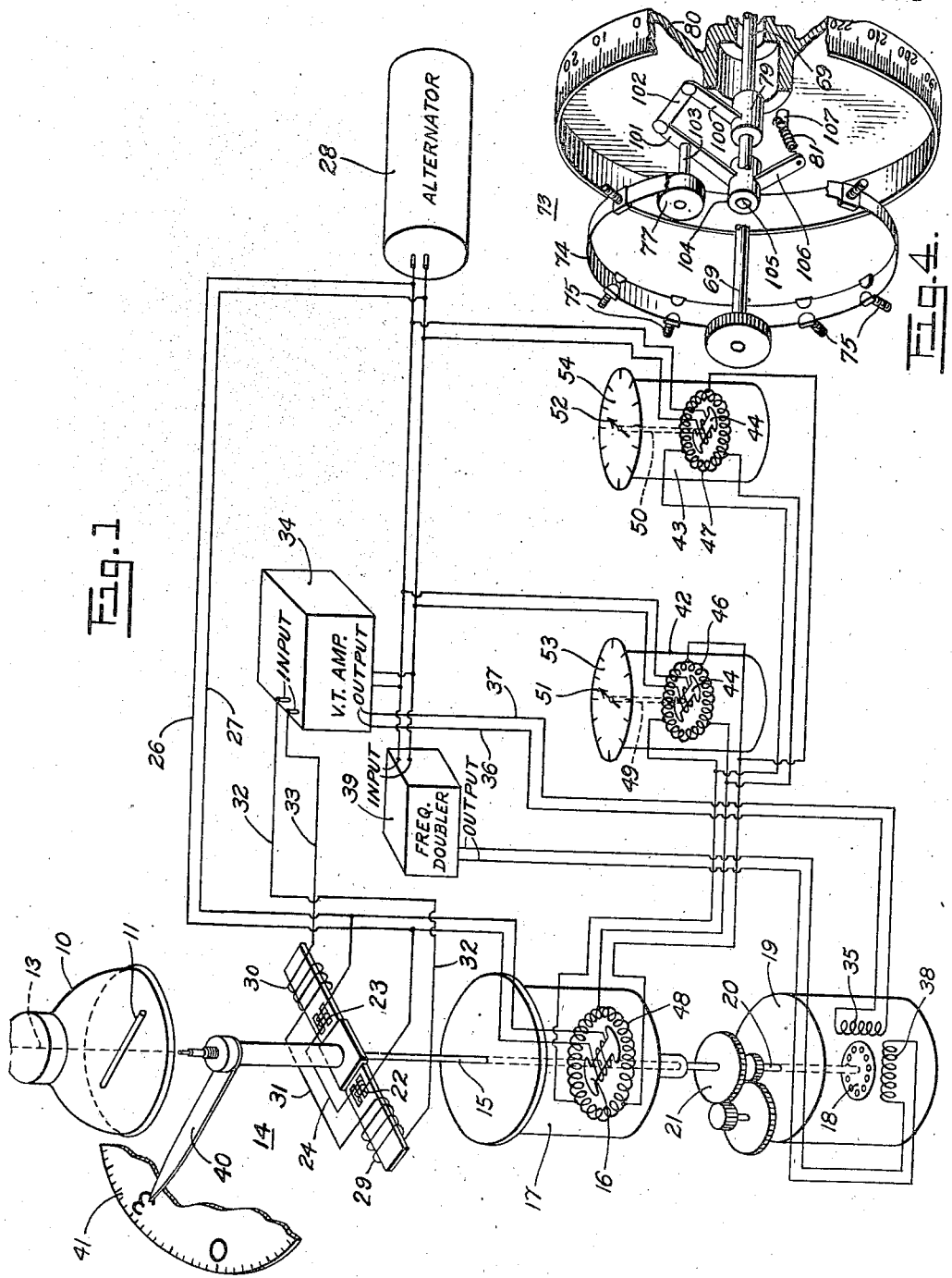
INVENTOR.
Paul A. Noxon
BY
           ATTORNEY.

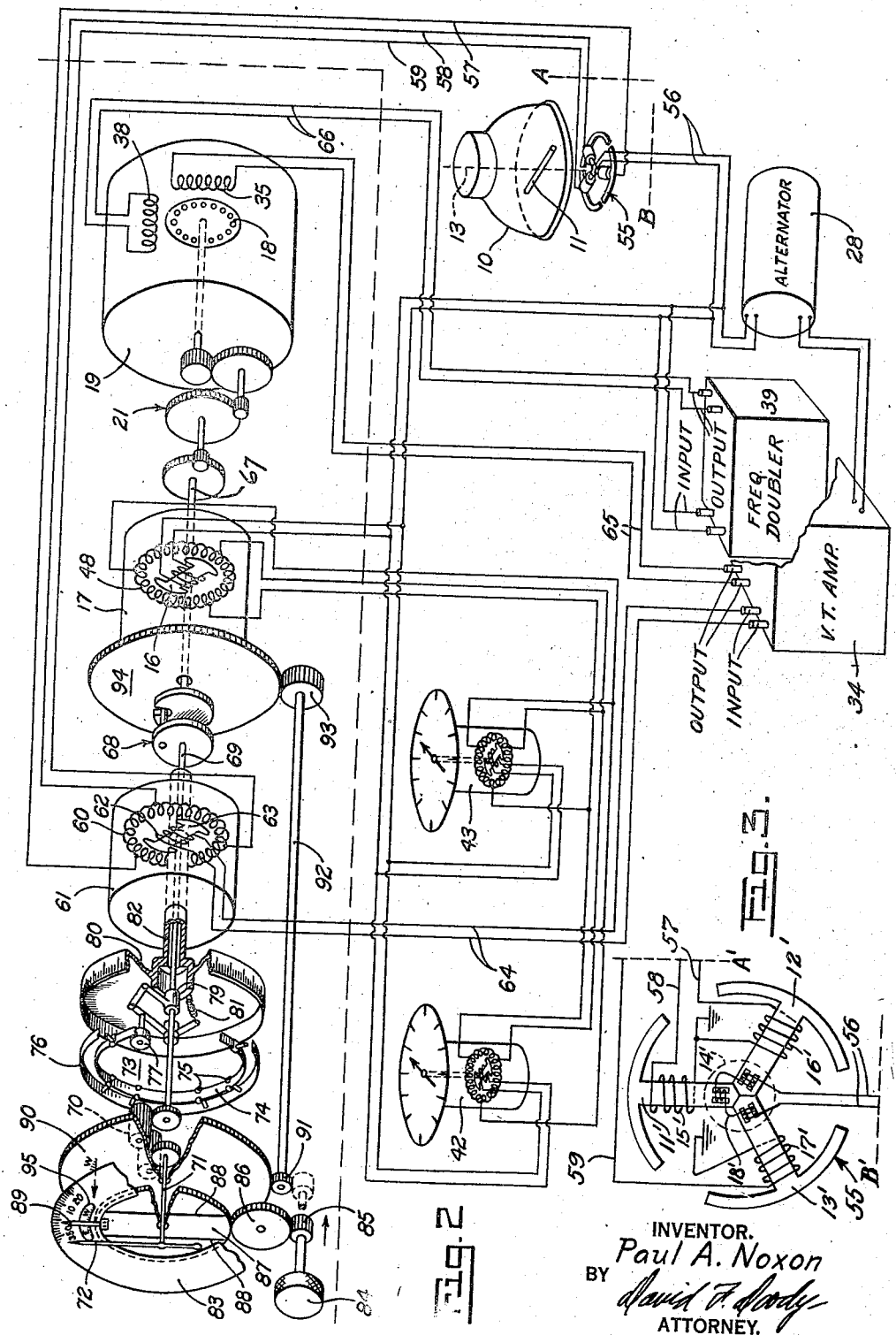

Patented Jan. 19, 1943

2,308,566

UNITED STATES PATENT OFFICE 2,308,566

MAGNETIC REPEATER OR COMPASS

Paul A. Noxon, Tenafly, N. J., assignor to Bendix Aviation Corporation, South Bend, Ind., a corporation of Delaware Application June 13, 1940, Serial No. 340,396

14 Claims. (Cl. 33—204)

This invention pertains to magnetic repeaters, particularly a repeating and indicating system for magnetic compasses.

At the present time, magnetic compasses are generally of two types, the magnetic needle type and the earth inductor type, which utilizes some element other than a magnetic needle, usually a closed coil spinning in the earth's field, which generates voltages that are made to actuate an indicating mechanism to define a course or to show bearing in azimuth. The magnetic needle type of compass is well known, but has heretofore had many limitations which restrict its usefulness as a navigating instrument. Among the principal disadvantages of the conventional magnetic needle type of compass are the tendency for the card to spin during a turn or upon acceleration of the carrying vehicle, due to the coupling between the compass card and the usual damping liquid in which it rides, which coupling sets up a frictional error known as swirl, and its inability to indicate, or repeat the primary indication of the magnetc needle, at a point remote from the compass itself.

These and other disadvantages are overcome by the compass of the present invention as will be described later.

One of the objects of the present invention is the provision of a follower or repeater of a rotatable magnet which will indicate at a distance and with amplified torque, the position of the magnet with respect to a fixed reference.

Another object is the provision of a magnetic compass of novel design which includes a novel type of pick-up and indicating mechanism which will repeat indications of magnetic heading at a remote station.

Other objects of the invention include the provision of means in a magnetic compass system for compensating for deviation and variation errors, and a provision of a novel compass which will give an indication of azimuth through the medium of a torque amplifier.

These and other objects of the present invention will become readily understood upon a study of the following specification when made in conjunction with the attached drawings, throughout which like parts are designated by like reference characters.

Fig. 1 is a schematic diagram of the magnetic compass of the present invention; and Fig. 2 is a schematic diagram of another embodiment of the compass of the present invention.

Fig. 3 is a detailed showing of a portion of the circuit set forth in Fig. 2, and Fig. 4 is a detailed showing of the cam compensating mechanism set forth in Fig. 2.

In general terms, there is provided by the present invention, a compass of the magnetic needle type, in which the errors due to swirl, acceleration and the turbulence of the damping liquid are eliminated to all practical purposes. The compass includes one or more magnetic needles carried by any suitable float means in a damping liquid within a closed bowl and has no indicating card attached to the magnets. Closely adjacent the magnetic needle element there is positioned a magnetic pick-up or flux gate which, in circuit with a two-phase induction motor, acts to move a pointer over an azimuth scale at a master station and which, through the incorporation of an Autosyn transmitting and receiving system, provides simultaneous indications of bearing at any desired number of remote stations.

Having particular reference to Fig. 1, there is shown at 10 a compass bowl carrying a magnetic needle 11, upon any conventional float in any suitable damping liquid. Magnetic needle 11 is pivoted by any suitable means, not shown, so that it has an axis of rotation as designated by dotted line 13. A suitable magnet, pivot and float arrangement is shown in the patent to Weber, et al., 2,008,481, but since the present showing of a compass is schematic, no pivot or float is illustrated, and only one magnet 11 is shown. The scale shown in the Weber patent is unnecessary in the use of the present invention, as no readings are to be taken directly from bowl 10, which may be opaque, and of metal such as brass or aluminum or of non-metallic material such as Bakelite, etc. Immediately below the bottom of compass bowl 10, there is located a pick-up device or flux gate 14 of permeable material, such as "Permalloy" or "Mumetal," which may be of the type described in the application Serial No. 336,444, filed May 21, 1940, and assigned to the assignee of the present invention.

Flux gate 14 is carried by, and is capable of rotation with shaft 15 to which is connected a rotor 16 of a transmitting Autosyn 17. The rotor 18 of a two-phase induction motor 19 is connected to a shaft 20 and to shaft 15, through a speed reducing gear train designated generally as 21. Flux gate 14 has an exciting winding, including coils 22 and 23 connected in series by means of conductor 24 to leads 26 and 27 which are, in turn, connected to the output of alternator 28. Coils 22 and 23, when energized through alternator 28, will saturate the portion of pick-member 14 in the region occupied by coils 22 and 23. Member 14 also carries output coils 29 and 30 which are connected in series by means of conductor 31 and to the input of the vacuum tube amplifier 34 by means of leads 32 and 33. A suitable amplifier may be one such as shown and described in Morecroft's "Principles of Radio Communication" (2nd edition) at page 906 or page 942. The output of amplifier 34 is connected to one phase 35 of two-phase motor 19, through conductors 36 and 37. The other phase 38 of motor 19 is connected to alternator 28 through a frequency doubler 39. The frequency doubler may be of any conventional type such as that shown and described in pages 706 and 707, "Principles of Communication" by Morecroft, 2nd edition. Phase 38, during operation of the device shown in Fig. 1, is constantly energized through alternator 28, but self-rotation of rotor 18 is possible only when phase winding 35 is energized by coils 29 and 30, through amplifier 34. As long as magnet 11 has its longitudinal axis at right angles to the longitudinal axis of member 14, which condition is represented in perspective in Fig. 1, no resultant voltage will exist in the output of coils 29 and 30, since the magnetic field of magnet 11 is at right angles to each leg of flux gate 14, and no flux cuts coils 29 and 30, and therefore no voltages will be generated in coils 29 and 30. When no voltages are generated in these coils, the current flow in phase winding 35 is zero. Thus, phase 35 is deenergized and rotor 18 is maintained stationary. When, however, the craft carrying the compass of the present invention turns in azimuth, there will be a departure of the rectangular relationship above set forth, between magnet 11 and flux gate 14, and the magnetic field of magnet 11 will thread through legs carrying coils 29 and 30 in one direction or the other, depending upon the direction in which the craft is turned. Immediately there will be a voltage apparent in leads 32 and 33 due to the flux of magnet 11 flowing through the legs of flux gate 14 which, after amplification in amplifier 34, will energize phase winding 35, causing rotation of flux gate 14 to its new null position since the direction of the flux, through the legs of flux gate 14, upon disturbance of the rectangular relation, above mentioned, depends upon the direction in which the carrying craft is turning, and since the direction of flux determines the instantaneous polarity of the voltages induced in coils 29 and 30, and thus the polarity of the instantaneous voltage in phase winding 35, it will be apparent that motor 19 can be made to always turn the flux gate 14 in the proper direction to reestablish the rectangular or null relation of the flux gate with the field of magnet 11.

An indicating pointer 40, movable over an azimuth scale shown partially at 41, is connected with shaft 15 of flux gate 14, so as to be rotatable therewith. Thus, any departure of flux gate 14 from its null position with respect to magnet 11, will cause rotation of the flux gate and consequent indication of this rotation by pointer 40 and azimuth scale 41. Indicating pointer 40 and scale 41 comprise a master indicator. Remote indicators, such as Autosyn receivers 42 and 43, can be considered as examples of repeating indicators which may be placed at any desired stations in an aircraft or on shipboard. Rotors 44 are energized by current from alternator 28 in the conventional manner, and stators 46 and 47 are connected in parallel to the stator 48 of transmitting Autosyn 17, the rotor 16 of which is also energized by current from alternator 28. As angular rotation of flux gate 14 upon shaft 15 turns rotor member 16 therewith, it will be readily understood that shafts 49 and 50, carrying pointers 51 and 52, movable over azimuth scales 53 and 54, will repeat the indications of pointer member 40 and scale 41.

While the compass system shown in Fig. 1 affords a positive indication of azimuth at any desired number of stations, the embodiment of the invention shown in Fig. 2 has not only the advantages of the system shown in Fig. 1, but it also shows a means whereby corrections for deviation errors may be introduced so that the final magnetic indication need not be referred to a calibration chart, but read directly from the azimuth scale. Also, a means is shown whereby a true magnetic bearing may be converted to a true geographic bearing if the variation between the magnetic and geographic poles is known.

The magnetic compass bowl 10, having needle 11, may be of exactly the same construction as the corresponding element shown in Fig. 1. Directly below compass bowl 10, and having its center point located on the axis of rotation 13 of magnet 11, is a pick-up or flux gate 55, which may be of the type shown in the above mentioned Serial No. 336,444.

The flux gate is shown in detail in Fig. 3 and the lines A and B of Fig. 1 indicate the limits (corresponding to lines A' and B', respectively, of Fig. 3) of the detailed showing of Fig. 3. Winding 18' is carried in a three-part section upon the inner portion of each of legs 11', 12' and 13' and leads 56 are connected to alternator 28, and the ampere-turns of winding 18' and the current from alternator 28 are so related that periodic saturation of the inner or armature portion 14' of flux gate 55 is effected when, during each half-cycle of alternation the current from alternator 28 reaches the value adequate to cause complete saturation of armature portion 14'.

It is understood, of course, that in each half-cycle, current rises from zero to maximum and falls to zero, and any desired value of current may be established as the saturating value. Output windings 15', 16' and 17' are carried by legs 11', 12' and 13', respectively, and the inner end of each of these coils is connected to ground while the outer ends of these coils are connected by means of leads 57, 58, and 59 to the circuit of Fig. 2 as designated by the numerals 57, 58, and 59 in Fig. 2. It will be understood that upon periodic saturation for a portion of each half-cycle of alternation of alternator 28, armature 14' becomes saturated, resulting in a great change of reluctance of the armature 14', and therefore of the number of lines of flux therein due to the field of magnet 11. Due to this change of reluctance, the flux which prior to saturation, threaded through legs 11', 12' and 13', will leave these legs and will thereby induce voltages in coils 15', 16', and 17', which voltages will vary upon rotation in the field of magnet 11 in accordance with the well known cosine law of variation.

Leads 56 from the inner or exciting winding are connected to alternator 28, and leads 57, 58 and 59 from the outer windings (output coils) of flux gate 55 are connected to the stator 60 of Autosyn 61, as shown schematically in Fig. 2. Coil 62, carried by rotor member 63, is connected through leads 64 to the input of vacuum tube amplifier 34, the output of which is connected through leads 65 to phase winding 35 of the two-phase induction motor 19. The other phase winding 38 is continuously energized by alternator 28 through frequency doubler 39 and leads 66. Induction motor 19 is operatively connected through speed reducing gear train 21 to a shaft 67 which, by any conventional coupling means 68, is connected to another shaft 69. This shaft 69 is, in turn, coupled through a planetary gear train 70 to shaft 71 carrying pointer 72.

As so far described, and in view of the explanations contained in the above identified applications, it will be apparent that the voltages induced in the output coils of flux gate 55 will be connected through leads 57, 58 and 59 with stator 60, and will induce a resultant voltage in coil 62 of rotor 63. The resultant voltage or current is amplified by means of vacuum tube amplifier 34, the output of which may be of any power rating desired, so that phase winding 35 can be energized to turn rotor 18 of induction motor 19, and also shafts 67, 69 and 71, causing indicating pointer 72 to indicate bearings in azimuth.

When magnetic needle 11 is situated in an environment that distorts the earth's magnetic field, errors due to deviation of the earth's field will, unless corrected, cause pointer 72 to give an erroneous magnetic bearing. In order to correct the errors due to deviation, the cam correcting mechanism 73 is introduced so that pointer 72 will be advanced or retarded by the number of degrees necessary to change the apparent magnetic heading to the correct magnetic heading. This correcting mechanism includes cam track 74, which is supported at intervals of 10 or 15 degrees, by clamp members 75 having adjustable screw-threaded shanks engageable with the annular supporting ring 76, which ring, while shown broken partly away, is circular and is carried by a conventional instrument casing, not shown. A cam follower, such as a roller member 77, is carried by a flexible linkage shown in detail in Fig. 4, wherein a sleeve member 79, integral with an arm 100, tightly embraces shaft 69 so as to turn therewith. Arm 100 is connected to a crank-arm 101 by means of a loose link 102. A spindle 103, extending angularly from crank-arm 101, carries cam follower 77 which is journaled to the end portion thereof. Crank-arm 101 has an integral hub member 104 which is pivotally secured with respect to the disc portion of scale 80 by means of a pin member 105 extending through hub member 104. Hub member 104 has a second crank-arm 106 integral therewith, to which is attached, at its outer end, a coiled spring member 81 with one end anchored to disc portion of scale 80 by means of an upstanding pin member 107. Cam follower 77 is urged against cam track 74 by means of spring member 81 connected between a crank arm of linkage 78 and the hub portion of scale 80. Hub portion of scale 80 has connected thereto a hollow shaft 82 which carries rotor 63 of Autosyn 61.

Pressure upon cam follower 77, which is exerted radially of shaft 69, will cause crank-arm 101 and crank-arm 106 to be rotated as a unit about pin member 105. Motion is transmitted from cam follower 77 to these crank-arms through spindle 103. Assuming that the radial pressure exerted is toward the axis of shaft 69, crank-arm 101 will tend to be rotated clockwise, but since shaft 69 can be rotated only under control of motor 19 while scale 80 is free to move, scale 80 will be rotated in a counter-clockwise direction, and since scale portion 80 carries the rotor 62 of Autosyn receiver 61 upon the shaft 82, rotor 62 will be moved counter-clockwise through the same angle that scale 80 moves. If we assume that rotor 63 was at rest prior to the exertion of the radial force upon cam follower 77, it will be appreciated that a voltage will be set-up in coil 62, which, after amplification in amplifier 34, will energize phase winding 35 to cause rotation of shaft 69 through the same angular amount, but in the opposite direction from the direction of scale 80 in order to restore coil 62 to its null position, at which point, phase winding 35 being de-energized, rotation of shaft 69 ceases, but this rotation (due to radial pressure upon cam follower 77) has caused pointer 72 to move by the angular amount necessary to offset the counter-rotation of scale 80. If we assume that the reading of scale 80, under any fixed index mark, not shown, was (prior to the imposition of the radial force of cam follower 77) the same as the reading indicated by pointer 72, and if cam follower 77 has been moved radially by an amount sufficient to make pointer 72 now indicate the bearing corrected for deviation (which deviation, of course, is known), then scale 80, after rotation of shaft 69 has stopped, will have again turned clockwise so that under its index, scale 80 reads the same as it did prior to its counter-clockwise motion. We see then that in this particular case, motion of scale 80, counter-clockwise and carrying rotor 63, has caused induction motor 19 to operate to restore rotor coil 62 to its null position, and has therefore turned shaft 69 clockwise, and in so turning it returns scale 80 in a clockwise direction through the medium of the linkage above described. It is because of this follow-up action of scale 80 that the bearing read thereon is the uncorrected, rather than the corrected, bearing which is read from pointer 72. Because of spring member 81, which yields upon motion of cam follower 77 in a direction radially of shaft 69, scale 80 will follow shaft 69 through the linkage including members 100, 101 and 102, without lost motion. The tension of spring 81 may be so adjusted that scale 80, which carries only the small load imposed by the bearings of shaft 82 and rotor 63, may readily be rotated upon rotation of shaft 69.

In order to correct the magnetic bearings so that the correct bearings may be read from pointer 72, the adjustable screw threaded shanks of clamp members 75 are adjusted radially of shaft 69 within the instrument casing (not shown) so that cam track 74 may be made to follow the proper contour to effect corrections at every 10 or 15 degree points, in accordance with the well known practice of deviation correction which is common in the art. It is believed that one skilled in the art will appreciate the steps of "swinging ship" and adjustment of members 75, necessary to cause cam follower 77 to impart through the rotation of scale 80, its shaft 82, and rotor member 63, the necessary motions to compensate for the deviation errors peculiar to each compass installation.

As an example of the process of correction, let us assume that the bearing reading on scale 80 is zero degrees, and that pointer 72 has not been corrected for deviation and therefore indicates a bearing of zero degrees. If, from an appropriate deviation chart or curve, it appears that at an indicated bearing of zero, the corrected bearing is 350 degrees, adjustment is made to the threaded shank of clamp 75 corresponding to the zero degree position, by screwing it in radially until scale 80 moves counter-clockwise to the 350 degree position. This carries shaft 82 and rotor 62 ten degrees counter-clockwise from the null position, and upon energization of the system (assuming no change in course) induction motor 19 rotates rotor 62, by movement of shaft 69 and scale 80, clockwise ten degrees, restoring rotor 62 to its null position and scale 80 to its zero degree position. Since, before this clockwise motion, pointer 72 was on zero course, it will have been moved ten degrees counter-clockwise, or to the 350 degree, or corrected, position. Pointer 72 moves counter-clockwise upon clockwise rotation of shaft 69 as the planet train 70 causes reversal of rotation of shaft 71, as can be readily seen from an inspection of Fig. 2. Cam member 74 may be of spring steel and its surface will readily conform to adjustment, resulting in a smooth track for roller 77. Thus, scale 80, at any time, will indicate the apparent magnetic bearing uncorrected for magnetic deviation, while pointer 72 will move over scale 83 by the angle necessary to indicate the bearing corrected for magnetic deviation.

Scale 83, which may be called the master indicator scale, therefore reads correct magnetic bearings and by the use of an Autosyn transmitter 17 having its rotor 16 connected so as to be rotated upon shaft 67, a repeating system, including Autosyn receivers 42 and 43, as described in connection with Fig. 1, may be provided. It is felt that further explanation of this repeating system is unnecessary at this point.

A manual adjusting knob 84 is provided with a shaft having a pinion 85 engageable with a gear 86 and teeth on course selecting disk 87, having grid or lubber lines 88, and a course pointer 89. By this adjusting mechanism, any desired course can be selected and will be indicated by the position of pointer 89 upon azimuth scale 83. If it is desired to steer the course indicated by pointer 89, then it is necessary only to keep pointer 72 parallel to grid lines 88.

Correction for variation is obtained through the medium of the following mechanism:

A supplemental scale 90, which contains graduations designated as degrees, which may be indicative of degrees east and west variation, has teeth on its peripheral edge engaging with a pinion 91 to which is connected a shaft 92, having a pinion 93 at its end remote from pinion 91. Pinion 93 is engageable with teeth formed upon end-plate 94, which end-plate is rigidly fixed to the stator casing of Autosyn 17. Pinion 85 may be advanced into engagement with pinion 91, as indicated by the dotted lines, upon depression of manual adjusting knob 84. When knob 84 is so depressed, and is rotated by the amount of rotation corresponding to the correct number of degrees of east or west variation applicable, the stator casing of Autosyn transmitter 17 is advanced or retarded by the same number of degrees. By means of the planetary gearing 70 rotation of scale 90 by means of adjusting knob 84 does not affect the setting of pointer 72 when dial 90 is at rest. Motion is transmitted through the spur gear carried on the end of shaft 69 through the intermeshing pinions which are included in the planet gearing and to the spur gear carried upon shaft 71. When scale 90 is in angular motion, the intermeshing planet gear arrangement 70 rotates freely about the gears of shafts 69 and 71 without causing either shaft 69 or 71 to be rotated. Rotation of the stator of Autosyn 17 introduces the proper variation correction into the repeating system, including remote Autosyn indicators 42 and 43. At the same time, the correction for variation can be observed through a window 95 in the face of scale 83. The amount of variation correction introduced may be gauged by any suitable index, not shown, on the face of scale 83.

It will be seen that by the magnetic compass system shown in Fig. 2, both master and repeater indications of magnetic bearing, corrected for deviation errors, may be had, and if the variation between the magnetic and geographic poles is known, then the pilot or operator may introduce this correction at the master station and all readings thereafter, whether at the master, or at any of the repeater stations, will be referred to the earth's geographic, rather than the earth's magnetic pole. By this system, a particular compass installation eliminates the necessity of a calibration chart, as corrected readings may be taken directly from scale 83. At the same time, the uncorrected readings may be read from scale 80, so that at the time of installation, the amount of correction for deviation at any point in azimuth may be observed.

In describing the embodiments of the compass shown in Figs. 1 and 2, it has been assumed that axis 13 passes vertically through the center of flux gates 14 and 55, and through the center of rotation of magnetic needle 11. This condition is true, of course, when the carrying aircraft or ship is in a steady, level condition. Of course, during intervals when the carrying vehicle pitches and rolls, axis 13 departs from the true vertical, but this means merely that magnet 11 and flux gate 14 or 55 are no longer in parallel, horizontal planes. However, as long as the flux gate is in the closed magnetic field of magnet 11, true operation of the compass results regardless of whether or not the flux gate is maintained horizontal with respect to magnet 11. It is believed that this is apparent to those skilled in the art of navigation without further explanation.

The above description has been limited to a magnetic compass. However, the present invention is equally well suited for use in any system requiring a primary or remote indication of the position of a magnetic needle with or without torque amplification, without reaction upon the prime mover. For example, if it is desired to repeat the indication of a sensitive galvanometer, this result may be accomplished by the substitution of a magnetic needle for the usual galvanometer needle, and the pick-up device, or flux gate 14 or 55, when placed within the influence of the magnetic field of the needle, will repeat the indications thereof in the same manner that it will repeat the indications of the system when used as a compass.

While only two embodiments of the present invention have been shown, it is to be understood that the invention is not limited to these examples, but by the scope of the appended claims.

What is claimed is:

1. A magnetic compass comprising a magnet disposed in the earth's magnetic field, a pick-up device of permeable material mounted within the field of said magnet and threaded thereby, a source of alternating current, means in circuit therewith and included in said pick-up device for periodically saturating and unsaturating a portion of said permeable material, whereby the field of said magnet is alternately expelled from and threaded through said pick-up device, coil means on said device separated from said saturating means and inductively related to said pick-up device, and an indicating device having coil means conductively connected to the first-mentioned coil means, a coil inductively coupled to the second-mentioned coil means for designating the direction of the field of said magnet and an index connected to said inductively coupled coil.

2. A magnetic compass comprising a magnet disposed in the earth's magnetic field, a pick-up device within the influence of the field of said magnet, a transmitting Autosyn, an induction motor, shafts having a common axis about which said pick-up device, transmitting Autosyn and induction motor are rotatable as a unit, said pick-up device being of permeable material and having means associated therewith to alternately saturate and unsaturate a central portion of said device and coil means in which are induced voltages depending on the angle of rotation between said magnet and an axis of said pick-up device, an amplifier having its input connected to said coil means and its output to said induction motor, whereby said shafts may be rotated, a pointer rotatable with said shafts to indicate direction in azimuth, a transmitting Autosyn having its rotor connected to rotate with said shafts, an Autosyn receiver having a stator and a rotor, the stators of said transmitting and receiving Autosyns being electrically connected together, and an indicating member carried by the rotor of said receiving Autosyn, whereby upon movement of said shafts, said indicating member will indicate the angular movement thereof.

3. A magnetic compass including a magnet disposed within the earth's magnetic field, a pick-up device of permeable material located in proximity thereto so as to be influenced by the field of said magnet, means for periodically saturating a portion of said pick-up device, coils on said device, an Autosyn receiver having a rotor and a stator, said coils being electrically connected to said stator, a winding carried by said rotor, a vacuum tube amplifier, an induction motor having two-phase windings, means for exciting one of said two-phase windings with alternating current, said winding carried by said rotor being connected to the other of said two-phase windings through said vacuum tube amplifier, a transmitting Autosyn having a stator section and a rotor section, shafting common to said induction motor and said rotor section, a second receiving Autosyn having connections to said transmitting Autosyn and an indicator, cam means for compensating for magnetic deviation and a second indicator associated therewith for giving a reading of magnetic heading corrected for deviation, and selector means operable to introduce correction of said magnetic heading to headings measured with respect to geographic meridians, and means activated by said selector means to rotate said stator section of said transmitting Autosyn, whereby the indicator associated with said second receiving Autosyn will read headings with respect to geographic meridians.

4. A magnetic compass comprising a magnet, a pick-up device of permeable material adjacent said magnet, and within the influence of its magnetic field, a motor in circuit therewith and having two phase windings and a rotor associated therewith, means for energizing one of said phase windings with a constant alternating current, coils carried by said pick-up device and energized by alternating current to alternately saturate and unsaturate a portion of said pick-up device, windings carried by said pick-up device in which are induced voltages due to the varying of the field of said magnet in response to the saturating and unsaturating of said portion, electrical connections between said windings and the other of said two-phase windings, a shaft means securing said pick-up device to said shaft, and indicating means associated with said shaft, whereupon as said rotor is rotated, said indicating means will show the angular displacement of said shaft.

5. A magnetic compass including a magnet, a flux gate of permeable material disposed in close proximity thereto, said magnet and said flux gate having a common axis of rotation, said magnet being rotatable in azimuth with respect to said flux gate in response to the directive influence of the earth's magnetic field, a motor having a rotor and stator, means associated with said flux gate and the stator of said motor to operate said rotor when said magnet and said flux gate have been relatively displaced from a null position, and indicating means controlled by rotation of said rotor to designate angles in azimuth.

6. A magnetic compass comprising a magnet mounted for free response in azimuth to the directive force of the earth's magnetic field, a flux gate disposed within the field of said magnet, an indicator of azimuth, and motor means controlled by said flux gate to move said indicator in azimuth in response to relative rotation between said magnet and said flux gate.

7. A magnetic compass comprising a magnet freely rotatable in azimuth, a flux gate within the influence of the field of said magnet including a member of permeable material, exciting and output coils thereon, a motor, an indicator of azimuth, connections between said output coils and said motor, and means connected to said exciting coil for intermittently saturating a portion of said flux gate, whereby an alternating current is induced in said output coils, and operates said motor to control the rotation of said indicator of azimuth.

8. A magnetic compass comprising a magnet having an axis of rotation and being mounted for free rotation about said axis in response to the directive force of the earth's field, a flux gate of permeable material having the same axis of rotation, said flux gate being within the field of said magnet, a motor, a shaft connecting said motor and said flux gate, an indicator controlled by movement of said motor, and means responsive to relative rotation between said magnet and said flux gate to rotate said flux gate and actuate said indicator of azimuth.

9. An indicator of the direction of a magnetic field including a magnet having a directional magnetic field and being mounted for free rotation about a fixed axis, a flux gate of permeable material disposed within the influence of said magnetic field and being symmetrical about said axis, an exciting winding and output windings on said flux gate, a motor, an indicator controlled thereby, connections between said output coils and said motor, and means in circuit with said exciting winding for intermittently saturating a portion of said flux gate, whereby voltages are induced in said output coils and control said motor and indicator to show the direction of the field of said magnet.

10. An indicator of the direction of a magnetic field comprising a magnet, a pick-up device of permeable material located within the influence of the field of said magnet, an exciting winding and output coils carried by said device, an indicating element and a motor having a rotor for controlling movement of said indicating element, and a stator member having polyphase windings, a source of alternating current connected to one of said polyphase windings, said source of alternating current having a branch connected to said exciting winding, whereby said winding intermittently saturates a portion of said pick-up device, and said output coils being connected in a circuit including another of said polyphase windings to control the rotation of said motor.

11. A magnetic compass including a magnet disposed in the earth's magnetic field and mounted for free rotation in response to the directive force of the earth's field, a permeable pick-up member within the influence of the field of said magnet, means carried by said pick-up member for intermittently saturating a portion thereof, coil members carried by said pick-up member, a motor, an indicator driven by said motor, and connections between said motor and said coil members, whereby rotation of said motor is under control of said pick-up member.

12. An indicator of magnetic direction comprising a magnet freely mounted to be responsive to an external directive force, a flux gate of permeable material disposed within the influence of the field of said magnet, said magnet and flux gate having a common axis of rotation, a motor having a rotor and a stator, means associated with said flux gate and the stator of said motor to operate said rotor when said magnet and said flux gate have been relatively displaced from a null position, and indicating means for showing the relative angular displacement between said magnet and an arbitrary index.

13. A magnetic compass repeater system comprising a compass having a magnet rotatable under the influence of the earth's magnetic field, core means of magnetically permeable material disposed in magnetic relation with said compass magnet, whereby the latter induces a magnetic flux therein, coil means on said core means having an input and output, a source of periodically varying current connected to the input of said coil means for periodically varying the magnetic flux in said core means, whereby an alternating current is generated at the output of said coil means as a function of the relative rotation between said compass magnet and said core means, an electromagnetic device having a rotor and a stator and being connected for energization by said periodically varying current and by said generated alternating current, whereby the rotor thereof is actuated upon relative rotation between said compass magnet and said core means, and means drivably connected to said rotor for actuation thereby.

14. A magnetic compass repeater system comprising a compass having a magnet rotatable under the influence of the earth's magnetic field, core means of magnetically permeable material disposed in magnetic relation coaxially with said compass magnet, whereby the latter induces a magnetic flux therein, coil means on said core means having an input and output, a source of periodically varying current connected to the input of said coil means for periodically varying the magnetic flux in said core means, whereby an alternating current is generated at the output of said coil means as a function of the relative rotation between said compass magnet and said core means, an electromagnetic device comprising a rotor and a stator having a multi-part winding, one of said parts being connected for energization by said periodically varying current and the other of said parts being connected for energization by said generated alternating current, whereby said rotor is actuated upon relative rotation between said compass magnet and said core means, and means drivably connected to said rotor for actuation thereby.

PAUL A. NOXON.